United States Patent Office 2,836,935
Patented June 3, 1958

2,836,935

SURFACE TREATMENT OF MOLYBDENUM AND TUNGSTEN FOR GLASS SEALING

John E. Stanworth, Ecclesall, Sheffield, Harold Rawson, Newbold-on-Avon, near Rugby, and Mary Knowles, Rugby, England, assignors to The British Thomson-Houston Company Limited, a British company No Drawing. Application June 12, 1952
Serial No. 293,204

Claims priority, application Great Britain July 4, 1951

4 Claims. (Cl. 49—81)

This invention relates to the making of glass-to-metal seals for electrical purposes.

In the manufacture of glass-to-metal seals where either molybdenum or tungsten is the metal employed, difficulties are encountered owing to the rapid oxidation of the metal on heating. Both these metals, when heated in air, are readily oxidised at comparatively low temperatures, and, in the case of molybdenum particularly, a very volatile oxide is produced. In constructing vacuum devices employing glass to molybdenum seals great care and skill must be employed to avoid the deposition within the vacuum device of oxides of molybdenum which might be harmful to the operation of the device. A well-known method of avoiding this difficulty is to sheath the molybdenum with glass before the wire is sealed into the vacuum device. The sheathing of the molybdenum itself, however, is a skilled operation if the optimum amount of oxide is to be retained at the glass/metal interface. Another difficulty with the conventional molybdenum glass seals is that the molybdenum oxide at the glass/metal interface may be attacked during service (for example, by humid atmospheres) in such a way as to lead to failure of the seal.

It is the object of the present invention to treat tungsten and molybdenum so that they become very resistant to oxidation, and thus to provide a means of making seals which are easy to manufacture and which are not subject to subsequent destruction by the attack of water vapour or of oxidising atmospheres at high temperatures.

Both molybdenum and tungsten silicides are resistant to oxidation, and it has been found that both molybdenum and tungsten when coated with silicide do not "smoke" when heated in a coal gas/air or coal gas/oxygen flame, whereas under similar conditions the uncoated metals produced clouds of oxide.

This invention consists in producing a film of silicide on the surface of the molybdenum or tungsten which is resistant to oxidation, but which does not adversely affect the other sealing properties of the metal, for example, the expansion properties.

In practice it is found that there are two convenient methods of producing silicide coatings and these are as follows:

(a) The vapour deposition method

In this process a volatile halide of silicon is passed over the metal which is heated to a temperature at which the compound is decomposed at the surface to form an adherent coating. Hydrogen is used as a carrier gas and the hydrogen halide which is the by-product of the reaction is flushed off in the stream of gas.

We have silicided both tungsten and molybdenum using silicon tetrachloride as the volatile halide. Pure dry hydrogen was bubbled through silicon tetrachloride then passed over the metal which was heated in a furnace to temperatures of 1200° C. to 1400° C. for periods of time ranging from two hours to half-an-hour depending on the thickness of coating desired. This schedule produces good oxidation-resistant films on the surface of the metal.

The following reaction takes place:

$$Mo + SiCl_4 + H_2 \rightarrow Mo\ silicides + HCl$$

(b) The pack method

The only real difference in principle between this method and the vapour deposition method is that in the pack method the silicon tetrachloride is produced by reaction between hydrogen chloride and silicon. There are various modifications of the technique; in the one which we prefer the molybdenum or tungsten is placed in a boat containing silicon powder and a mixture of hydrogen and hydrogen chloride is passed over the boat in a furnace. The hydrogen chloride reacts with the silicon to form a volatile compound of the silicon which, in turn, reacts with the molybdenum or tungsten to form the corresponding silicide. Suitable coatings have been produced by this method by heating for 15 minute periods at various temperatures ranging from about 700 to 950° C. and so on. The metal need not be put into direct contact with the silicon. It can be so placed in the furnace tube that the hydrogen-hydrogen chloride gas mixture passes first over the heated silicon to produce the volatile halide, and then passes over the metal where the silicide is formed.

Yet another modification of this technique is to place the metal in a boat containing a mixture of an ammonium halide and silicon. The boat is heated in a slow stream of hydrogen and the ammonium halide decomposes and the hydrogen halide thus formed reacts with the silicon to produce a silicon halide which, in turn, reacts with the metal to form a silicide. If it is desired, alumina powder may be added to the boat mixture to prevent sintering of the silicon; thus molybdenum has been silicided by packing the metal in a boat with a mixture consisting of 45% silicon, 10% ammonium fluoride and 45% alumina, and heating this at 1300° C. for four hours in a slow stream of pure dry hydrogen.

The use of silicided tungsten and molybdenum in the manufacture of glass-to-metal seals is of advantage because sealing techniques are made easier and the resistance of the seals to humid atmospheres or to oxidising conditions is increased. In connection with the methods of making such seals with silicided metal, the following points should be borne in mind:

(1) To obtain good seals, i. e. bubble-free seals to alumino-silicate glasses such as are used in making mercury arc street lamps, it is necessary to heat the silicided wire either in air or hydrogen before attempting to seal the wire to the glass. The treatment we have used is to heat either in air or hydrogen for 15 minutes at 1200° C. These conditions do not seem to be particularly critical but they give satisfactory results when a seal is to be made to alumino-silicate glasses of high softening point.

(2) In spite of the pre-heating treatment described in the previous section, we have found that if the seals are heated too strongly when being made bubbles appear at the glass metal interface. This is the case whatever siliciding temperature is used (i. e. in the range 775° C. to 825° C.).

(3) We find that even very thin silicide layers can change the expansion characteristics of the molybdenum noticeably. A particular glass which would seal satisfactorily to untreated molybdenum gave cracked seals when sealed to the molybdenum which had been treated for 15-minute periods at 775° C., 800° C. and 825° C.

(4) No cracking trouble has been experienced with a boro-silicate glass normally used for sealing to Fernico type alloy. For this we use siliciding temperatures in the range 775° C. to 825° C. for 15 minutes. As far as we can tell from the leak tests which we have done, the silicided molybdenum boro-silicate seals are vacuum tight.

What we claim as new and desire to secure by Letters Patent of the United States is:

1. A method of making glass-to-metal seals which are free from the oxide of the metal which comprises the steps of selecting a metal from the class consisting of molybdenum and tungsten, passing a volatile halide of silicon over the metal at a temperature of 1200–1400° C. for a time ranging from one-half to two hours in the presence of hydrogen until the surface of the metal is covered with a film of the silicide of the metal, and then sealing the metal so treated into the glass.

2. A method as set forth in claim 1 wherein the volatile halide of silicon is prepared continuously during the process by reacting a hydrogen halide with silicon.

3. A method as set forth in claim 1 wherein the volatile halide of silicon is prepared continuously during the process by reacting silicon with a hydrogen halide formed by the decomposition of an ammonium halide in a stream of hydrogen.

4. A glass-to-metal seal for electrical purposes between glass and a metal selected from the group of molybdenum and tungsten having a surface film thereon of the silicide of the metal.

References Cited in the file of this patent
UNITED STATES PATENTS

| | | |
|---|---|---|
| 448,915 | Erlwein | Mar. 24, 1891 |
| 1,774,410 | Van Arkel | Aug. 26, 1930 |
| 1,885,562 | Swinne | Apr. 26, 1932 |
| 2,239,551 | Dalton et al. | Apr. 22, 1941 |
| 2,501,051 | Henderson et al. | Mar. 21, 1950 |
| 2,536,774 | Samuel | Jan. 2, 1951 |

FOREIGN PATENTS

| | | |
|---|---|---|
| 383,681 | Great Britain | Nov. 24, 1932 |
| 117,856 | Austria | Dec. 2, 1943 |